April 10, 1951
F. W. REEDER ET AL
2,548,240
DEVICE TO FACILITATE AMPUTEE
OPERATION OF MOTOR VEHICLES
Filed Nov. 12, 1946
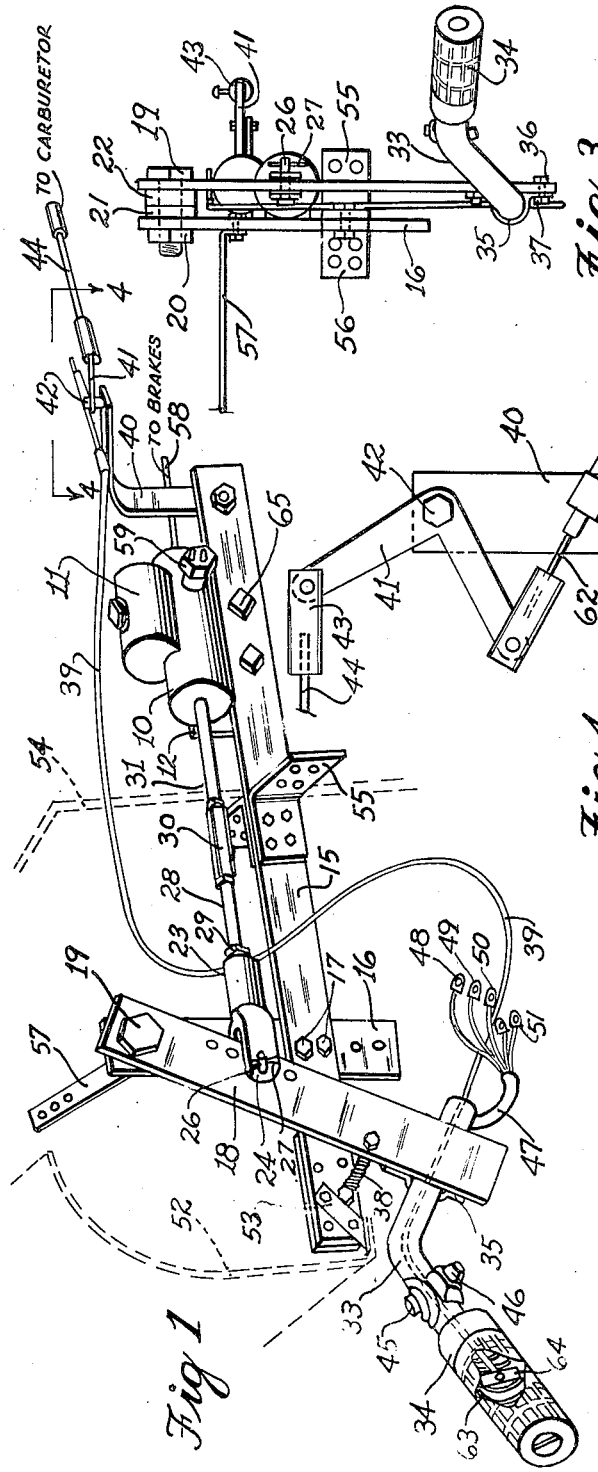
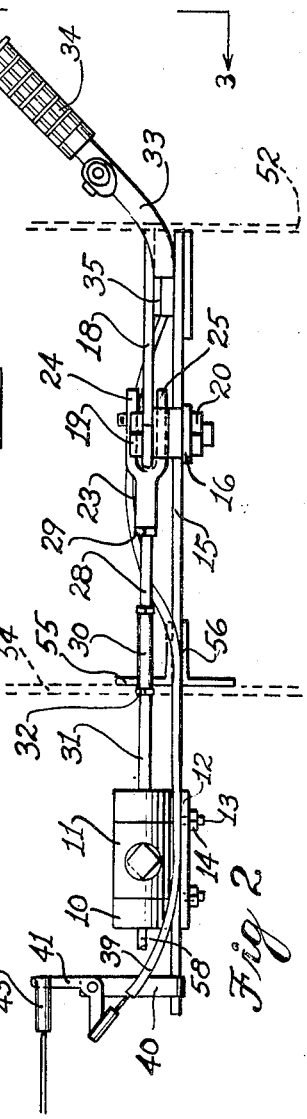
INVENTORS
FRED W. REEDER &
MICHAEL E. ONDOV
BY
Wilkinson & Mawhinney
ATTORNEYS Patented Apr. 10, 1951

2,548,240

UNITED STATES PATENT OFFICE 2,548,240

DEVICE TO FACILITATE AMPUTEE OPERA-
TION OF MOTOR VEHICLES

Fred W. Reeder and Michael Edgar Ondov,
Lorton, Va.

Application November 12, 1946, Serial No. 709,280

8 Claims. (Cl. 192—3)

1

The present invention relates to improvements in device to facilitate amputee operation of a motor vehicle and has for an object to provide a device whereby one having lost the use of both legs may competently control the operation of a motor vehicle.

Another object of the present invention is to provide a device wherein the braking and accelerating of the vehicle is in a single instrumentality and operable by use of one hand only and requiring no foot operation whatsoever.

A further object of the invention is to provide a device which may be installed in conjunction with the existing accelerating and brake operating mechanisms in order that the amputee or members of his family may drive the same vehicle.

A still further object of the invention is to provide a device that can be economically produced, that is simple in construction, requires little or no maintenance in its upkeep, which is very durable, and can be very quickly and efficiently installed.

The invention as herein illustrated and described is adapted more particularly for use in connection with an Oldsmobile Hydramatic drive, although it will be understood that the invention, possibly with some slight mechanical changes, is suitable for installation and use on vehicles having other types of control.

With the foregoing and other objects in view, the invention will be more fully described hereinafter and more particularly pointed out in the appended claims.

In the drawings, in which like parts are denoted by the same reference characters throughout the several views, Figure 1 is a perspective view of one embodiment of a device constructed in accordance with the present invention.

Figure 2 is a top plan view of the same.

Figure 3 is an end elevation taken from the right-hand of Figure 2.

Figure 4 is an enlarged top plan view of a form of carbureter actuating crank arm with the improved device connected thereto.

Referring more particularly to the drawings, 10 designates a master brake cylinder and its fluid reservoir 11. Stud bolts 13 project laterally from one side of the cylinder 10 and pass through the upper portion of a plate 12, being secured to the plate by means of nuts 14. The lower portion of the plate 12 is fitted against one side of a carrier bar 15 near one end thereof, such plate 12 being secured to the carrier bar 15 as by the bolts or other fastenings 65. The arrangement is such that the axis of the brake cylinder 10 is disposed approximately longitudinally of the vehicle and substantially parallel with the lengthwise dimension of the carrier bar 15. It will also be seen that such axis is not in vertical alignment with the carrier bar 15 but to one side of the same to align with the plane of swinging movement of the lever by which motion is communicated to the conventional plunger in the brake cylinder 10.

A vertical support bar 16 is erected at a suitable distance from the other end portion of the carrier bar 15 and may be adjustably secured to the carrier bar as by means of bolts 17 or other appropriate fastenings.

An operating lever 18 is pivoted about a bolt 19 passing through the upper portion thereof and also passing through the vertical support bar 16 at the upper portion thereof. The bolt 19 is retained in place by means of a nut 20. There are two washers 21 and 22 carried by bolt 19 and lying between the operating lever 18 and the vertical support bar 16 to act as bushings primarily to give clearance to the pivotal movement of the operating lever 18 from the carrier bar 15.

A stirrup drag link 23 is bifurcated and has legs 24 and 25 which straddle the operating lever 18 and are pivotally connected to same by means of a bolt 26 retained in place by a cotter pin 27. One end of an operating rod 28 is affixed to the stirrup drag link 23 and retained in place by means of a nut 29, the other end of said rod engaging a turn buckle 30. A master brake cylinder operating rod 31 is threadedly received in the other end of the turn buckle 30 and locked in place by a nut 32.

At the lower portion of the operating lever 18, there is an operating bar and handle 33 and 34 respectively. The operating bar 33 is carried upon the operating lever 18 by a strap 35 retained in place by bolts 36 and nuts 37. The operating lever 18 is retained in the upper position by means of a coil spring 38, one end of which is affixed to the carrier bar 15 and the other end to the operating lever 18. The operating bar and handle 33 and 34 are similar to that of a motorcycle handle bar and grip.

A flexible conduit 39 carrying slidably within it a flexible rod 62 extends from the operating bar 33 to an inverted L-shaped support bracket 40 to which the forward end of the conduit 39 is affixed by a clamp or strap 61 with the forward end of the flexible rod 62 projecting forwardly and slidably therefrom. This forward end of the flexible rod 62 is connected to one arm of a V-type crank or bell-crank 41. The bell-crank 41 is pivoted upon the L-shaped support bracket 40 as by means of a bolt 42. The other arm of the V-type crank 41 carries a connector 43 coupled to the carbureter actuating rod 44.

The rear end of the flexible cable 39 passes through the handle bar 33 and into the hand grip 34 which is rotatably mounted upon the handle bar 33. Internally such hand grip 34 carries a spiral groove 63 in which travels a pin 64 outstanding from the rear end of the flexible rod 62 which projects beyond the rear end of the flexible conduit 39.

A horn button 45 and a beam control light switch 46 are carried upon the operating bar 33. There is also a cable 47 passing from the operating bar 33 which carries the following leads: 48, hot lead to horn; 49, hot lead to high light beam; 50, neutral to lights; 51, hot lead to low light beam.

The device is mounted on the motor vehicle to the right-hand side of the conventional steering wheel in such a manner that one end of the carrier bar 15 is affixed to the instrument panel 52 by a bracket 53 and extends through the dashboard 54 to which it is affixed by brackets 55 and 56. A strap 57 is extended substantially normal to the vertical support bar 16 to a point to the left of the steering wheel and is affixed thereto by means of bolting same.

There is a fluid line 58 connecting the master brake cylinder 10 with the wheel braking system. There is also provided on one side of the master brake cylinder 10 a pressure static contact making switch 59 for controlling the tail lights of the vehicle to warn when the brakes are being applied.

The present invention is installed and operated as follows:

A slot is cut in the dashboard 54 to permit the carrier bar 15 to pass therethrough. A hole is drilled in said dashboard to permit the master cylinder operating rod 31 to pass therethrough. The carrier bar 15 is retained in place by means of brackets 55 and 56 which are bolted to the carrier bar 15 and which are also bolted to the dashboard 54. The carrier bar 15 is also affixed to the inside lower portion of the instrument panel 52 by brackets 53.

An additional hole is drilled through the dashboard 54 to accommodate the passage therethrough of the control cable 39 which terminates upon the leg member of the L-shaped support bracket 40 and is retained thereupon by means of a strap 61. The interior or sliding member 62 is affixed to one arm of the V-shaped crank 41 which will control the accelerator of the vehicle. To accelerate the vehicle, one turns the operating handle 34 is a clockwise direction; and to decelerate the vehicle, one turns the operating handle 34 in a counter-clockwise direction. When the vehicle is at rest, the operating lever 18 and the operating bar 33 are retracted to their uppermost positions by the coil spring 38.

The operator assumes the normal position behind the conventional steering wheel and places the right-hand upon the operating handle 34 and rotates same in a clockwise direction to accelerate the vehicle. When at the discretion of the operator it becomes necessary to slow down and subsequently stop the vehicle, he rotates the operating handle 34 in a counter-clockwise direction and at the same time presses down upon the operating bar 33 which causes the operating lever 18 to pivot forwardly about the bolt 19, thus driving the operating rod 28 and the master cylinder operating rod 31 forward which drives the piston within the cylinder and forces the brake fluid through the fluid line 58 thus applying the brakes to the vehicle.

When it is again desired to set the vehicle in motion, the operator merely pulls up on the operating bar 33 while gripping the operating handle 34 and at the same time turning said operating handle in a clockwise direction which causes the vehicle to once again accelerate.

The operator may blow the horn by means of pressing upon the horn button 45. During night driving, the operator may select either the high or low beam of the headlights by merely snapping the beam control switch 46 to the left or right thus lighting either high or low filament.

The device described herein may be adapted for use with various sizes of automobiles and is thus provided with several selective openings passing through its bar construction to facilitate the adjustability of the various members which are retained by bolts.

It will be noted that the flexible conduit and its encased flexible rod 62 are brought forwardly from the forward end of the handle bar 33 in a rather wide loop before these members are carried upwardly rearward of the dashboard 54. Also such members are formed reversely to the lower wide loop before bringing such elements to a correct horizontal position where the same will pass through the dashboard 54. These loops are important to prevent any sharp elbows or bends or any kinking in the flexible conduit which might result in the binding of the rod 62 therein. The loops, or at least one of them, are also very important in compensating for the movement of the lever 18 which is participated in by the handle bar 13 and by its rotary hand grip 34. Thus the flexible conduit 39 and its encased rod 62 must move back and forth with the handle bar 33 and with the lower portion of the lever 18 in an arc determined by the radius extending from the pivoted bolt 19 to the point of connection to the handle bar 33.

It will also be noted that the handle bar 33 has its major length directed in a generally fore and aft direction particularly when viewed with the lever 18 in a forward, substantially vertical position; but the rear portion of such handle bar 33 is desirably bent both laterally and upwardly in a component curve before straightening sufficiently to receive and support the rotary hand grip 34. This arrangement enables the hand grip 34 to be brought to a relatively high position with respect to the instrument panel 52 and sufficiently removed laterally from the steering wheel to be conveniently gripped in the right-hand of the operator and given its necessary forward and rearward movements.

It will further be noted that a single hand of the operator engaging a single instrumentality, namely the hand grip 34, suffices to perform both operations of braking on the one hand and either accelerating or decelerating the engine speed on the other hand, all by virtue of the fact that the hand grip 34 is constructed and arranged for compound movement which consists in rotary axial movement and forward and rearward pivotal movement, both movements being susceptible of being superimposed one upon the other and without regard to the position of the other.

It will also be noted that due to the construction and arrangement of the parts and the relative locations of the same that relatively great leverage and thrust may be developed from a small application of movement through the hand grip 34 which it will be noted is not only a forward but also a downward movement, thus taking advantage of the gravity weight of the operator's hand, arm and even bodily weight, while the coil spring 38 aids in the restoration of the parts.

It will be understood that in the single embodiment of this invention, as illustrated in the accompanying drawings, the bracket 40 may be bolted directly to the carbureter or to the engine block or to any other convenient support whereby it may approach much closer to the carbureter with which it more intimately functions; particularly in those cases where it is unadvisable to extend the carrier bar 15 to too great a length in a forward direction.

It is also to be distinctly understood that the present invention is not limited to cars of the Hydramatic or fluid drive types but may be used with any conventional type of vehicle. For instance, the invention is applicable where the driver possesses one good leg capable of operating the clutch pedal.

The use of the word "amputee" in the specification is not intended to be restrictive, but it will be appreciated that this invention is applicable to all cases in which the drivers have lost either the partial or full use of one or both legs provided that such drivers have the normal use of both arms and hands.

While we have disclosed herein the best form of the invention known to us at the present time, we desire it to be understood that we reserve the right to make changes and modifications in the herein described embodiment of the invention provided such changes fall within the scope of the following claims.

What we claim is:

1. For use in a motor vehicle having a hydraulic braking mechanism and a carbureter control for controlling the speed of the motor and also having the usual dashboard and instrument panel, a device for facilitating amputee operation of the vehicle comprising a carrier bar mounted through said dashboard and extending into the motor and operator's compartments, a separate braking mechanism supported on said carrier bar in the motor compartment with its axis laterally of said carrier bar, a support bar in the driver's compartment upstanding from said carrier bar, a fulcrum at the upper portion of said support bar, spacing means on said fulcrum, a lever supported for movement on said fulcrum and spaced by said spacing means laterally of the carrier bar and in substantial alignment with the axis of said separate braking mechanism, a rigid adjustable connection between said lever and separate braking mechanism extending slidably through the dashboard, a handle bar rigidly carried by the lower portion of said lever, a rotary hand grip carried by said handle bar and projecting forwardly of the instrument panel, means to yieldably bias said lever and hand grip to a rearward and upward position, a flexible connection between said hand grip and the throttle control, said flexible connection having a loop formed therein in rear of the dashboard, and means in said hand grip for causing said flexible connection to move back and forth on rotary motion of the hand grip.

2. A device according to claim 1 characterized by the fact that said handle bar carries a horn button and a light switch with connections through the tubular handle bar to the vehicle horn and light circuits.

3. For use in a motor vehicle having a braking mechanism and motor speed control device, a device of the character described comprising a carrier bar adapted to be mounted through the motor vehicle dashboard for carrying the master cylinder for said braking mechanism at one end thereof, an operating lever pivotally carried by said carrier at the other end thereof, a reciprocating rod pivoted to said lever and adapted to be connected to actuate said braking mechanism, a lever extension attached to said lever across the same, a hand grip rotatably mounted on said lever extension, a reciprocating connection between said hand grip and said motor speed control device, conversion means between said rotary hand grip and said reciprocating connection for converting rotary movement of the hand grip to back and forth movement of said reciprocating connection, and passing longitudinally through said lever extension for accelerating or decelerating the speed of said vehicle, and spring restoring means connected between the end of said carrier bar carrying said operating lever and said operating lever for removing the brake actuating rod from said braking mechanism and restoring the same to an inoperative condition when pressure on said operating lever is removed.

4. For use in a motor vehicle having a hydraulic braking mechanism and a carbureter control for controlling the speed of the motor and also having the usual dashboard and instrument panel, a device for facilitating amputee operation of the vehicle comprising a carrier bar mounted through said dashboard and extending into the motor and operator's compartments, a separate braking mechanism supported on said carrier bar, a support bar upstanding from said carrier bar, a fulcrum on said support bar, a lever supported for movement on said fulcrum laterally of said carrier bar in substantial alignment with the axis of said separate braking mechanism, connecting means between said lever and separate braking mechanism extending slidably through the dashboard, a handle bar rigidly carried by said lever, a flexible connection between said handle bar and said throttle control, and means in said handle bar for causing said flexible connection to move back and forth on rotary motion of the hand grip to accelerate and decelerate the vehicle.

5. For use with a motor vehicle having a braking mechanism, motor speed control device and a dashboard and instrument panel, a device to facilitate amputee operation of a motor vehicle comprising a lever adapted to be pivotally mounted at its upper portion between said dashboard and instrument panel with its pivot axis being substantially horizontal, means for biasing said lever to a diagonal initial position wherein said lever extends from its upper pivot downwardly and rearwardly with respect to the vehicle from the axis of pivot, a lever extension carried by the free end of said lever extending from said lever beneath the instrument panel rearwardly of the vehicle so positioned as to be accessible to the hand of the vehicle operator occupying the driver's seat in the vehicle, brake actuating means one end of which is connected to said lever between said pivot and lever extension and the other end of which is adapted to be connected to the braking mechanism and accelerating and decelerating means one end of which is carried by said lever extension and the other end of which is adapted to be connected to the motor speed control device, whereby upon actuating said accelerating and decelerating means in the decelerating direction and pressing downwardly thereon said brake actuating means is actuated thereby arresting motion of the vehicle.

6. For use with a motor vehicle having a driver's seat, dashboard, instrument panel, braking mechanism and motor speed control device, a device to facilitate amputee operation of a motor vehicle comprising a support member having front and rear ends adapted to pass through the dashboard, retaining means carried by said support for retaining said support adapted to be attached to the dashboard, a standard carried by said support between said retaining means and the rear end of said support member and between the instrument panel and dashboard, a lever pivotally carried by said standard at its upper end with its pivot axis substantially horizontal, means for biasing said lever to an initial diagonal position with its free end rearwardly of the pivot axis, a lever extension carried by the free end portion of said lever, an operating handle on said lever extension being carried by the free end of said lever extension adapted to be accessible to the hand of the vehicle operator when the lever is in its initial position, brake actuating means one end of which is connected to said lever and the other end of which is connected to said braking mechanism, and accelerating and decelerating means carried by said handle and actuated thereby and adapted to be connected to the motor speed control device.

7. For use with a motor vehicle having a dashboard, instrument panel, braking mechanism and motor speed control device, a device to facilitate amputee operation of a motor vehicle comprising a support member having front and rear ends adapted to pass through the dashboard, retaining means carried by said support member for retaining said support with respect to said dashboard, a standard carried by said support between said retaining means and the rear end of said support, a lever adapted to be connected to said braking mechanism pivotally carried at its upper portion by said standard with its pivot axis substantially horizontal, means for biasing said lever to an initial diagonal position with its free end declined rearwardly of said support and pivot axis, a lever extension carried by the free end portion of said lever, extending rearwardly of said support and adapted to pass beneath the instrument panel, an operating handle on said lever extension carried by the free end portion of said lever extension, and accelerating and decelerating means one end of which is carried by said handle and actuated thereby and the other end of which is adapted to be connected to said motor speed control device.

8. A device as claimed in claim 3 wherein said carier bar is provided at its lever carrying end with an extension piece at substantially right angles to the end carrying said master braking cylinder for pivotally carrying said operating lever.

FRED W. REEDER.
MICHAEL EDGAR ONDOV.

REFERENCES CITED

The following references are of record in the file of this patent:

UNITED STATES PATENTS

| Number | Name | Date |
|---|---|---|
| 511,614 | Hommer | Dec. 26, 1893 |
| 1,671,375 | Oldfield | May 29, 1928 |
| 1,819,688 | Moore | Aug. 18, 1931 |
| 2,110,989 | Erickson | Mar. 15, 1938 |
| 2,336,682 | Gross | Dec. 14, 1943 |
| 2,411,500 | Bradley | Nov. 26, 1946 |

FOREIGN PATENTS

| Number | Country | Date |
|---|---|---|
| 321,348 | Great Britain | Nov. 7, 1929 |

OTHER REFERENCES

Autocar, Nov. 4, 1938, pp. 878–879.
Autocar, Jan. 31, 1947, pp. 96–97.